April 4, 1967

F. H. HIGHLEY 3,312,509

ANTI-SKID BRAKE PRESSURE MODULATOR

Filed Aug. 13, 1965

INVENTOR.
Frank H. Highley
BY
Donald P. Selvecki
HIS ATTORNEY

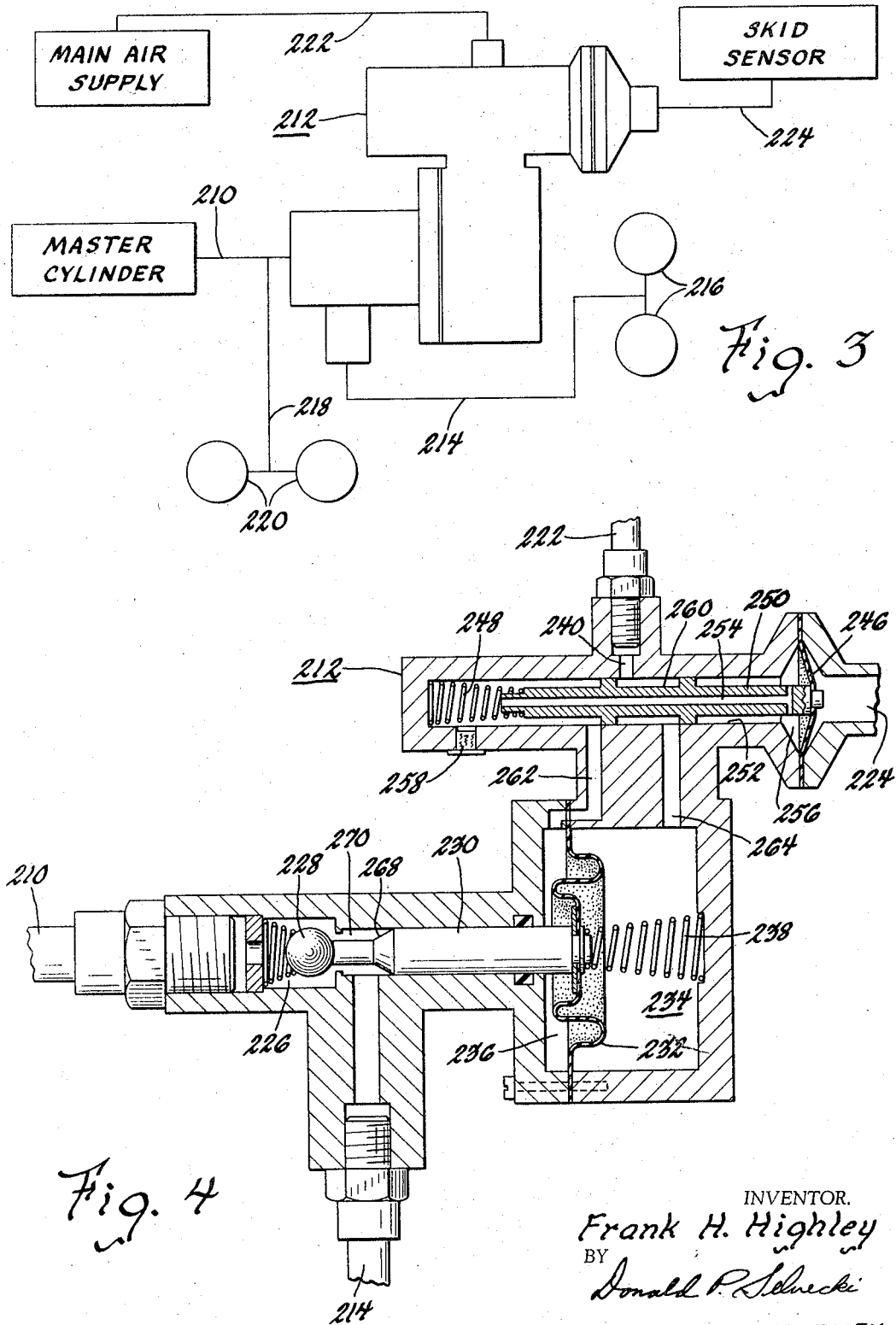

3,312,509
ANTI-SKID BRAKE PRESSURE MODULATOR
Frank H. Highley, Franklin, Mich., assignor to General Motors Corporation, Detroit, Mich., a corporation of Delaware
Filed Aug. 13, 1965, Ser. No. 479,486
9 Claims. (Cl. 303—21)

This invention relates to valving mechanism and more particularly to a brake pressure modulation valve for use with a brake anti-skid device.

Anti-skid devices of common design generally respond to vehicle or wheel deceleration rates to shut off braking pressure to vehicle wheel brakes that are likely to skid during given braking conditions. Generally, apparatus is provided that isolates one portion of the braking system from another portion. A common way for bringing about this isolation is a valve moving in the brake lines to vehicle rear wheel brakes. A problem is sometimes generated in systems of this kind by the lack of a positive means for reestablishing free fluid communication between a pressure source and the vehicle wheel brakes previously having had pressure shut off thereto. It is possible in a system not equipped with a valve of the type described in this disclosure to have a braking pressure remain shut off after the danger of a skid has passed, resulting in something less than optimum braking capability.

It is an object of the present invention to provide an improved valve which is positively operated in a fluid system both in the opening and in the closing condition.

It is another object of the present invention to provide an improved valve for use with a vehicle brake anti-skid device which is positively operated to isolate braking pressure from selected wheels and later is positively operated to reestablish free fluid communication to the selected wheels.

It is still another object of the present invention to provide an improved valving mechanism for use within vehicle brake anti-skid device which is set into operation by an impulse from a skid sensor and which then utilizes a separate power source to cycle the valve.

Further objects and advantages of the present invention will be apparent from the following description, reference being had to the accompanying drawings wherein preferred embodiments of the present invention are clearly shown.

In the drawings:

FIGURE 3 is a diagrammatic illustration of a vehicle braking system equipped with a skid sensor and with a valve which is operated by a separate positive pressure source;

FIGURE 4 is a sectional view of the valving mechanism used with the system shown in FIGURE 3.

Figure 1:
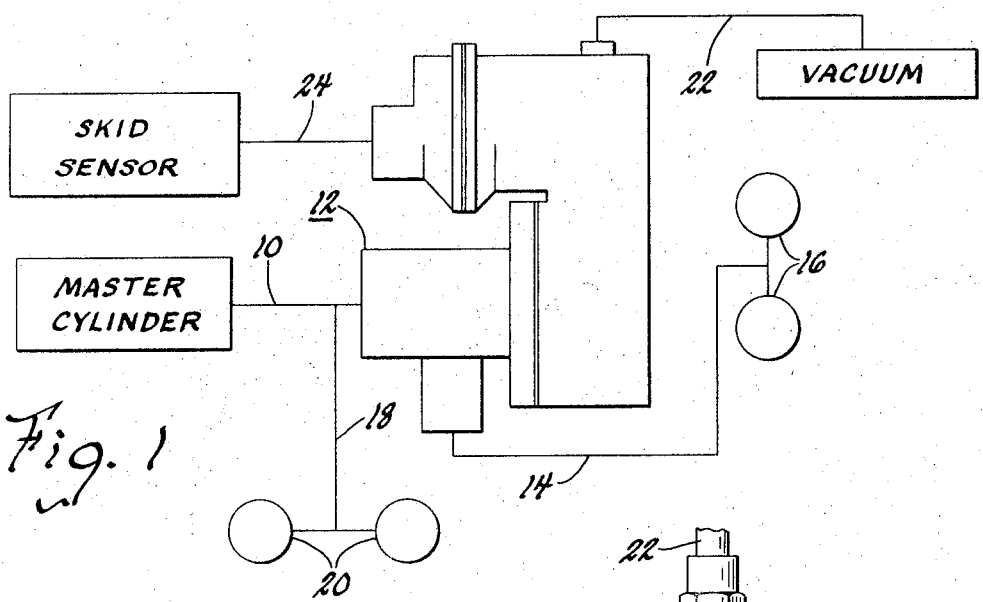
FIGURE 1 is a diagrammatic illustration of a vehicle braking system equipped with a skid sensor and with a valve utilizing negative pressure for operation thereof.

Referring to FIGURE 1, a master cylinder supplies braking pressure through line 10 which is an inlet to valve 12 and ordinarily provides a path for free fluid communication to line 14 which is an outlet from valve 12. Line 14 communicates pressure to vehicle wheel brakes 16. Vehicle wheel brakes 16 are designated as the vehicle wheels that are most likely to skid during severe braking conditions. Line 18 supplies braking pressure directly from the master cylinder to vehicle wheel brakes 20 which are deemed in the present illustration to be mounted on vehicle wheels less likely to skid during severe braking operation. A vacuum source is connected through line 22 to valve 12 and a skid sensor is operatively connected to valve 12 through means 24 which can take many forms. For example, means 24 can be a mechanical link, an electrical link, or can be a negative or positive pressure impulse. The particular means used in the given installation depends on the availability of the apparatus to bring about a signal from the skid sensor that it is in operation when the vehicle is in an incipient skid condition.

Figure 2:
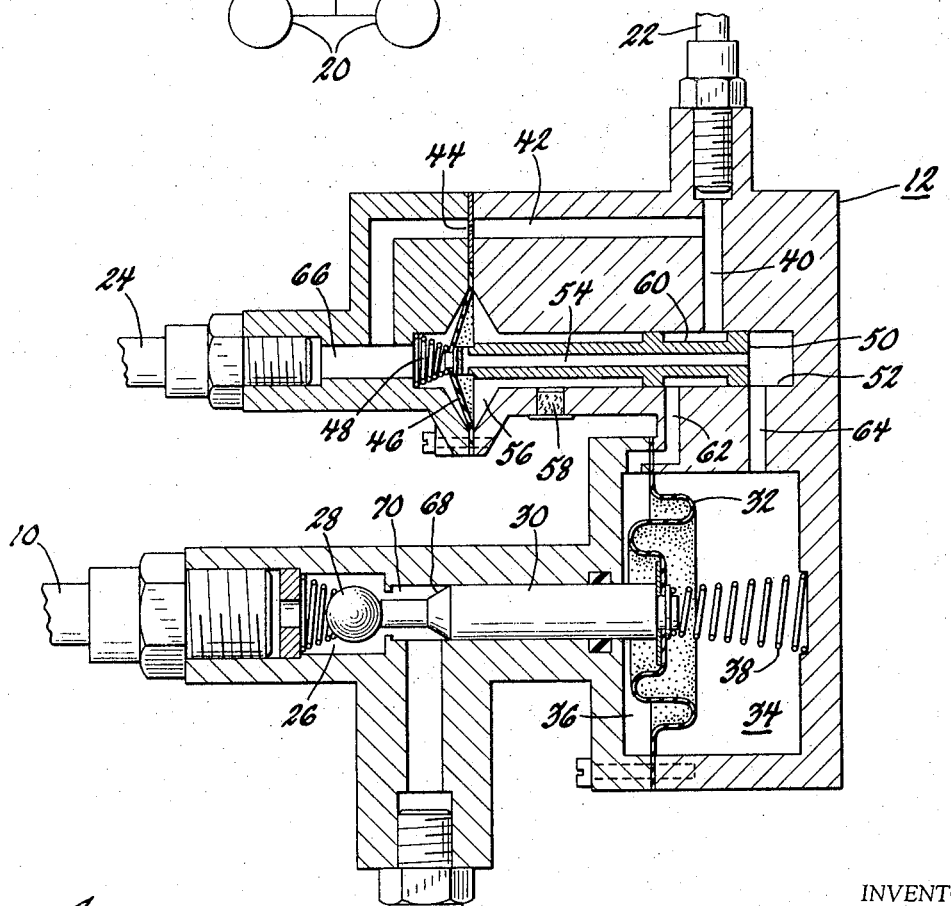
FIGURE 2 is a sectional view of the valve which is the subject of the present invention.

Referring to FIGURE 2, inlet 10 to valve 12 is illustrated as providing a path for fluid communication from the master cylinder into chamber 26. One end of chamber 26 provides a seat against which spring loaded check valve 28 can rest to block fluid communication between inlet 10 and outlet 14. Shiftable element 30 is carried by diaphragm 32 and is responsive to movement thereof to move and hold check valve 28 off the seat when an operative pressure exists in either chamber 34 or chamber 36, depending on the mode of operation chosen for the valve. Spring 38 assists the operative pressure in chamber 34 to drive check valve 28 from its seat.

Vacuum pressure from inlet 22 is applied in passage 40 and in passage 42. Passage 42 communicates through bleed port 44 with one side of diaphragm 46. Spring 48 acts on the same side of diaphragm 46 to push spool valve 50 toward the right, as viewed in FIGURE 2. The impulse from the skid sensor through means 24, in the example given, is illustrated as being vacuum pressure that can be selectively tapped from the vacuum power source available at inlet 22. The manner of tapping this pressure is left to the designer of the system and is not considered to be a part of the present invention except as functionally relating thereto.

Spool valve 50 is slidable in bore 52 and communicates pressure through passage 54 in the center thereof from chamber 56 maintained at atmospheric pressure through inlet 58. Vacuum from inlet 22 is maintained against diaphragm 46 and is also maintained in groove 60 of spool valve 50. A shifting of the position of groove 60 in bore 52 between passage 62 and passage 64 determines the operational response of diaphragm 32.

In operation, it will be assumed that FIGURE 2 illustrates the position of the valve elements as they would be during normal operating conditions with the brakes unapplied and, consequently, no incipient skid condition being expected. Referring to FIGURE 1 with the brakes applied in a manner bringing about an incipient skid condition, pressure from the master cylinder is communicated through line 10 to brakes 20 on wheels not likely to skid and to brakes 16 on wheels which are likely to skid. When the incipient skid condition occurs, an impulse from the skid sensor is transmitted from means 24 into valve 12.

Referring to FIGURE 2, this impulse is provided by the bleeding of atmospheric air to the left side of diaphragm 46. Under normal operating condition, the vacuum from inlet 22 communicated through passage 42 and bleed port 44 acts on diaphragm 46 to oppose spring 48. Spring 48 is therefore held in a slightly compressed condition and spool valve 50 engaging diaphragm 46 is maintained in the position illustrated in FIGURE 2 wherein groove 60 thereof establishes a path for negative pressure communication from passage 40 to passage 62. Passage 62 communicates the negative pressure to chamber 36 and, assisted by spring 38, maintains shiftable element 30 in the position shown in FIGURE 2 wherein check valve 28 is unseated. Under these conditions, free fluid communication is had between inlet 10 and outlet 14 resulting in equal braking capability existing at brakes 20 carrier by wheels not likely to skid and brakes 16 carried by wheels likely to skid.

As the incipient skid condition is reached and, in the example given, atmospheric air bled into chamber 66, the balance on diaphragm 46 is upset and, assisted by spring 48, diaphragm 46 shifts spool valve 50 into position where groove 60 thereof establishes a path for fluid communication from passage 40 to passage 64. A negative pressure from inlet 22 is thereby communicated to chamber 34 and a positive pressure from chamber 56 is communicated to passage 62 and chamber 36 resulting in a shifting of diaphragm 32 to the right, as viewed in FIGURE 2, against the force of spring 38. Shiftable element 30 follows this diaphragm movement and spring loaded check valve 28 moves in chamber 26 against its seat. Braking pressure is therefore cut off between inlet 10 and outlet 14 resulting in the prevention of further braking pressure build-up at brakes 16 carried by the wheels likely to skid after the incipient skid condition is reached. It should be noted that as chamfered edge 68 of element 30 moves in its bore, the volume in chamber 70 is increased resulting in a relieving of the braking pressure at brakes 16.

When the incipient skid condition is no longer present, the impulse from means 24 is cut off in a manner consistent with the particular skid sensor used and the cycle is reversed. This results in the stopping of the atmospheric pressure bled into chamber 66 and the reestablishing therein of a negative pressure condition through passage 42 and bleed port 44 from inlet 22. Diaphragm 46 is moved against the bias of spring 48 into its previously described balanced condition and spool valve 50 follows this movement. Groove 60 is moved in bore 52 back to the position shown in FIGURE 2 wherein negative pressure communication is restablished between passage 40 and passage 62 communicating with chamber 36. At the same time, passage 54, normally at atmospheric pressure communicated from chamber 56, communicates this pressure through passage 64 into chamber 34. It is seen that, when this occurs, negative pressure exists in chamber 36 on one side of diaphragm 32 and positive pressure is present in chamber 34 on the opposite side of diaphragm 32. This results in a movement of diaphragm 32 to the left, as viewed in FIGURE 2, and causes shiftable element 30 to move check valve 28 from its seat. When check valve 28 is positioned away from its seat, free braking pressure communication is had between inlet 10 and outlet 14 and the braking system described in FIGURE 1 functions in a conventional manner.

Another form of the subject invention is illustrated in FIGURES 3 and 4. Where applicable, the same reference numerals will be applied to the different portions of the valve illustrated in FIGURE 4, except that the numerals will be prefixed with the numeral 2 to designate this embodiment. In this second embodiment, the pressure operating the valve is a positive pressure from a compressed air source and the internal operation is thereby reversed to accommodate the positive pressure.

An inlet 222 communicates compressed air into valve body 212 and pressurizes groove 260 of spool valve 250. Spool valve 250 is slidably carried in bore 252 by diaphragm 246. Spring 248 biases spool valve 250 against diaphragm 246 and maintains spool valve 250 in a position shown in FIGURE 4 while the braking system is either functioning below an incipient skid condition or when the brakes are not operating. Passage 264 normally communicates with groove 260 and provides a path for compressed air communication between inlet 224 and chamber 234 formed on one side of diaphragm 232. Spring 238 biases diaphragm 232 toward ball check valve 228. Shiftable member 230 engages diaphragm 232 and, when in the poised position shown in FIGURE 4, maintains ball check valve 228 off its seat in chamber 226. Chamber 236 formed on the opposite side of diaphragm 232 from chamber 234 communicates through passage 262 with bore 252 and is normally at atmospheric pressure.

In operation, the description of the cycle will be initiated in the same manner as the previous embodiment with the assumption that the vehicle has not reached the incipient skid condition and the skid sensor has not yet responded to heavy braking. Under these conditions, free braking pressure communication is had between inlet 210 and outlet 214 through chamber 226, ball check valve 228 being unseated. Compressed air through inlet 222 communicates a positive pressure through groove 260 and passage 264 into chamber 234 maintaining diaphragm 232 to the left, as viewed in FIGURE 4.

As the vehicle is braked and reaches an incipient skid condition, means 224 transmits an appropriate impulse to diaphragm 246 imparting a leftward movement thereto. Spool valve 250 is shifted against the bias of spring 248 so that pressure communication is established between inlet 222 and chamber 236 through groove 260, as shifted, and passage 262.

As spool valve 250 shifts, atmospheric pressure normally present in chamber 256, as communicated through passage 254 in spool valve 250 and inlet 258, is communicated into chamber 234 relieving pressure therein. The combination of the build-up of pressure in chamber 236 and the relieving of pressure in chamber 234 results in movement of diaphragm 232 and shiftable member 230 toward the right, as viewed in FIGURE 4. Spring loaded check valve 238 is automatically seated, cutting off braking pressure communication between inlet 210 and outlet 214. As chamfered edge 268 of element 230 follows the movement of diaphragm 232, the effective volume in chamber 270 is increased thereby relieving braking pressure. When braking pressure is relieved, the wheels affected do not exceed the incipient skid force and wheel skid is avoided.

When the impulse from the skid sensor diminishes, spring 248 becomes the dominant force acting on spool valve 250 shifting groove 260 into fluid communication relation with inlet 222 and passage 264 thereby pressurizing chamber 234. Pressure is relieved from chamber 236 through passage 262 into bore 252 and atmospheric inlet 258. The pressure build-up in chamber 234 assisted by the compressive force of spring 238 drives diaphragm 232 and shiftable element 230 against ball check valve 228. Ball check valve 228 is thereby positively unseated restoring normal braking pressure communication between inlet 210 and outlet 214. The valving mechanism is then disposed for automatic recycling upon demand.

The utility of the subject invention is particularly apparent in the type of braking system described in that the unseating of a check valve shutting off braking pressure during an incipient skid condition has proved rather difficult in the typically designed anti-skid device because of the fact that only a spring force is normally available to unseat the check valve. This is particularly true when master cylinder pressures are extremely high during panic stop conditions when the incipient skid condition is reached rather rapidly. The subject invention is particularly adaptable in this environment because a pressure assist is given to the spring to unseat the check valve after the incipient skid condition is passed, thereby providing a very positive return to a normal braking capability.

While the embodiments of the present invention, as herein disclosed, constitute preferred forms, it is to be understood that other forms might be adopted.

What is claimed is as follows:

1. A modulating valve for a brake anti-skid device operating to shut off braking pressure increases during an impending skid condition of a vehicle, said modulating valve comprising: a valve body carried by a vehicle; an inlet to said body from a brake master cylinder and an outlet from said body to vehicle brakes whose braking is being controlled, said inlet and said outlet being isolatable from one another by a spring loaded ball check valve; first control means including a chamber having a diaphragm disposed therein operatively carrying a slidable valve engageable with said ball check valve; a control pressure source communicating positive and negative pressure into said valve body; second control means in fluid communication with said control pressure source and including a spool valve adapted to selectively direct negative pressure assisted by a positive pressure input from said control pressure source to opposite sides of said diaphragm; and means for transmitting an impulse from an anti-skid device to said second control means thereby shifting said control means to direct negative pressure from said control pressure source to one side of said diaphragm to cut off and relieve braking pressure to selected vehicle wheels and directing positive pressure to an opposite side of said diaphragm to assist the negative pressure; said spool valve being reversely shiftable by said control pressure source as the impulse from the anti-skid device is cancelled thereby directing negative pressure assisted by positive pressure to positively driving said diaphragm engaged shiftable member into said ball check valve to reestablish free pressure communication between said inlet and said outlet into said valve body from the vehicle braking system.

2. A modulating valve according to claim 1 wherein said spool valve of the second control means is positively driven in one direction by pressure from said control pressure source and is reversely shiftable by a spring member operating on an opposite side of the diaphragm from which said spool valve is disposed.

3. A modulating valve according to claim 1 wherein said spool valve of the second control means is positively driven in one direction by pressure from said control pressure source and is reversely shiftable by a spring member operating on the same side of the diaphragm from which said spool valve is disposed.

4. A modulating valve according to claim 1 wherein movement of the shiftable member of the first control means during conditions of operation establishing free fluid communication between said inlet and said outlet is brought about by a spring biasing the diaphragm and shiftable member assisted by atmospheric pressure vented to one side of said diaphragm through said spool valve of said second control means.

5. A modulating valve for a brake anti-skid device, said valve comprising: first control means including an actuator adapted to control a pressure in a vehicle braking system; positive and negative pressure sources; second control means for selectively routing positive and negative pressures to said actuator; said second control means including a control valve and pressure responsive means for operation thereof, said pressure responsive means having a first and second side; a first side of said pressure responsive means being connected to one of said pressure sources and said second side of said pressure responsive means having a restricted connection to another of said pressure sources; and a further connection between said pressure responsive means and said restricted connection adapted to be valved open and closed whereby the valving of said further connection cooperates with said control valve to selectively supply positive and negative pressures during every phase of valve operation to said first control means to control vehicle braking pressure.

6. A modulating valve according to claim 5 wherein the pressure source supplies vacuum pressure to said second control means.

7. A modulating valve according to claim 5 wherein the control pressure source supplies compressed air to said second control means.

8. A modulating valve according to claim 5 wherein said first control means includes a spring loaded ball check valve and a slidable element having a surface which is movable in the inlet to increase the effective area therein relieving brake pressure from said vehicle braking system.

9. A modulating valve according to claim 5 wherein said control means includes a diaphragm responsive to pressure from the control pressure source to move a spool valve thereby selectively directing pressure from said pressure sources to said first control means.

References Cited by the Examiner
UNITED STATES PATENTS

| | | | |
|---|---|---|---|
| 1,718,673 | 6/1929 | Wettstein | 91—376 X |
| 1,770,194 | 7/1930 | Bragg et al. | 91—376 X |
| 3,021,181 | 2/1962 | Fitch | 303—21 |
| 3,093,422 | 6/1963 | Packer et al. | 303—21 |
| 3,176,459 | 4/1965 | Parker | 60—60 X |
| 3,223,459 | 12/1965 | Packer | 303—21 |

FOREIGN PATENTS 962,933    7/1964    Great Britain.

EUGENE G. BOTZ, *Primary Examiner.*